No. 742,511. PATENTED OCT. 27, 1903.
E. W. STEBBINS.
WATER PIPE ATTACHMENT.
APPLICATION FILED MAY 23, 1902.
NO MODEL.
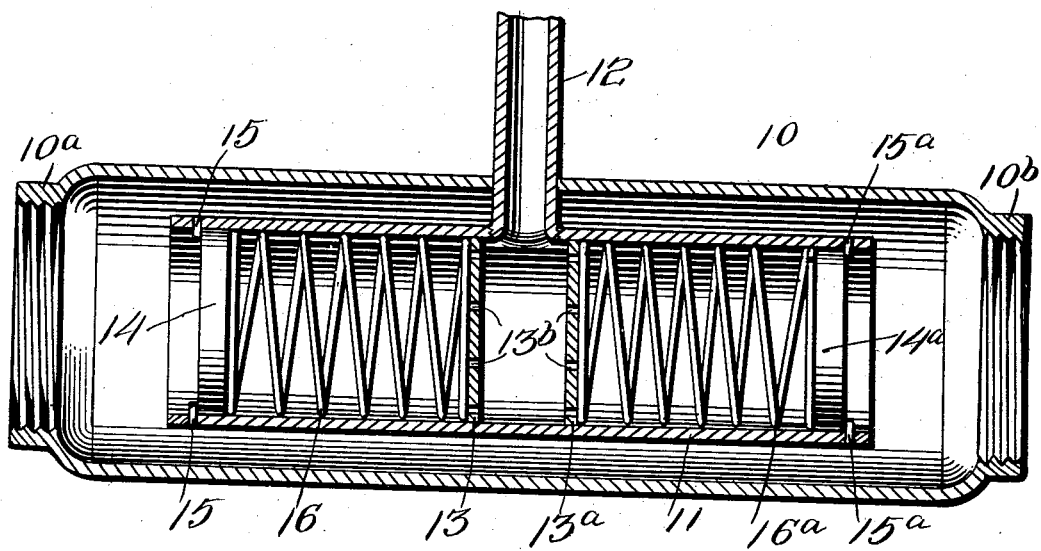

No. 742,511. Patented October 27, 1903.

UNITED STATES PATENT OFFICE.

EDWIN WILMER STEBBINS, OF ABBEVILLE, LOUISIANA.

WATER-PIPE ATTACHMENT.

SPECIFICATION forming part of Letters Patent No. 742,511, dated October 27, 1903.

Application filed May 23, 1902. Serial No. 108,686. (No model.)

*To all whom it may concern:*

Be it known that I, EDWIN WILMER STEBBINS, a citizen of the United States, residing at Abbeville, Vermilion parish, and State of Louisiana, have invented a new and useful Water-Pipe Attachment, of which the following is a specification.

This invention has for its object the production of an attachment to water-pipes to prevent them from bursting when subjected to abnormal pressure, more particularly from that caused by the action of frost; and the invention consists in a yieldable core inserted into the pipe adapted to resist the normal pressure, but which will yield under abnormal pressure, and thereby obviate danger of bursting the pipes, as hereinafter shown and described, and specified in the claims.

In the drawing illustrative of the invention the figure represents a longitudinal sectional elevation of the device applied.

In this device is comprised a sleeve or casing 10, having threaded inlet and outlet $10^a$ $10^b$ at the ends adapted to be connected to the adjacent ends of the water-pipes, so that the water will flow freely therethrough. Within the casing 10 is centrally disposed a cylinder 11, having a vent-pipe 12 connected therewith and leading outwardly through the side of the casing, as shown. This pipe 12 performs two functions—first, as a means of communication between the interior of the casing and the outside air, and, second, as a support to maintain the cylinder 11 within the casing 10. The casing 10 is somewhat larger than the cylinder 11, so that the water will freely flow around it, and the area between the cylinder and casing will equal the area of the pipes with which it is connected, so that the flow of the water will not be retarded by the presence of the attachment. Within the cylinder 11 are arranged two diaphragms 13 $13^a$, spaced apart at each side of the pipe 12 and each provided with a series of perforations $13^b$, as shown. In the ends of the cylinder heads 14 $14^a$ are disposed, the heads fitting water-tight in the cylinder and prevented from leaving the cylinder by pins 15 $15^a$, extending into the cylinder, as shown. Between the heads 14 $14^a$ and the diaphragms 13 $13^a$ are disposed springs 16 $16^a$, whose force is exerted to maintain the heads 14 $14^a$ normally outward in engagement with the pins 15 $15^a$. The springs will be strong enough to support the heads 14 $14^a$ in their outward position against the normal pressure of the water, so that so long as the pressure is normal the springs and heads will remain inactive; but in event of any abnormal pressure being exerted upon the heads they will yield and relieve the strain and prevent danger of the pipes bursting. This will occur more particularly in event of the freezing of the pipes, which frequently produces a dangerous expansion force and often results in the bursting of the pipes. When pipes in which this attachment is inserted therefore become frozen, the expansion will be exerted against the heads 14 $14^a$, which will yield and effectually prevent the bursting of the pipes.

The vent-pipe 12 permits the escape of the air from the cylinder 11 and is therefore a very important feature of the invention.

The device may be of any size to fit any-sized pipe and may be varied and modified in minor particulars without affecting the principle of the invention or sacrificing any of the advantages.

While two of the heads 14 $14^a$ are shown and the corresponding two diaphragms 13 and $13^a$, it will of course be understood that one head only may be employed under some circumstances with the same results. Two of the heads, however, will preferably be employed, as in that arrangement the device is more sensitive to the change of pressure from either direction.

Having thus described my invention, what I claim is—

1. A safety attachment for water-pipes consisting of a casing connected into the piping, a cylinder disposed within the casing and having a vent-pipe leading therefrom transversely through the casing for permitting air in the cylinder to escape when abnormal pressure is applied and for holding the cylinder supported within the casing against longitudinal movement therein, a water-tight head movably disposed within the cylinder, and a spring within the cylinder adapted to support said head against normal pressure but yieldable against abnormal pressure.

2. A safety attachment for water-pipes consisting of a casing for connection into the piping, a cylinder disposed in said casing and having movable water-tight heads disposed therein, spaced perforated fixed diaphragms disposed in said cylinder, springs disposed in said cylinder between said diaphragms and said movable heads, and a vent-pipe leading laterally from the chamber formed by said spaced diaphragms through said casing.

In testimony that I claim the foregoing as my own I have hereto affixed my signature in the presence of two witnesses.

EDWIN WILMER STEBBINS.

Witnesses:
EDWARD THORP,
SIMONET LE BLANC.